July 9, 1963

I. SHANK 3,096,533

FLOOR WASHING MACHINES

Filed Aug. 27, 1962

INVENTOR
IRA SHANK

BY:
Frederick C. Bromley
ATTORNEY

July 9, 1963

I. SHANK 3,096,533

FLOOR WASHING MACHINES

Filed Aug. 27, 1962

INVENTOR
IRA SHANK
BY:
Frederick C. Bromley
ATTORNEY

July 9, 1963     I. SHANK     3,096,533
FLOOR WASHING MACHINES
Filed Aug. 27, 1962     4 Sheets-Sheet 4
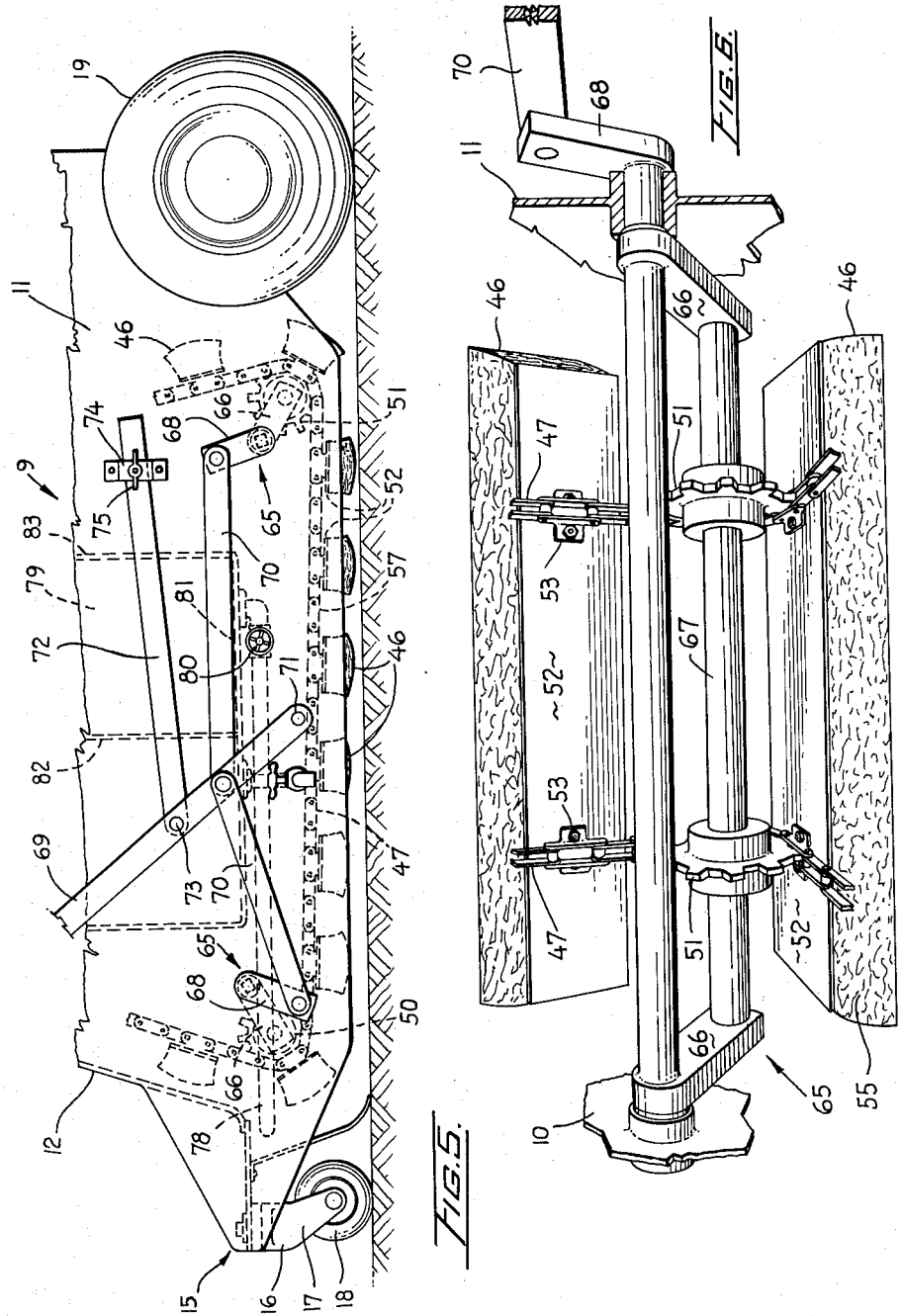
INVENTOR
IRA SHANK
BY: *Frederick E Bromley*
ATTORNEY

3,096,533
FLOOR WASHING MACHINES
Ira Shank, 340 Main St., Markham, Ontario, Canada
Filed Aug. 27, 1962, Ser. No. 219,802
6 Claims. (Cl. 15—99)

My invention relates to improvements in floor washing machines and has for its major object to provide a machine of this character which is highly efficient and serviceable.

A further aim of the invention is to provide a floor washing machine of the dirigible type which is easy to maneuver over a floor surface and which performs a complete floor washing operation, including the application to a floor surface of a cleansing solution and the co-operation therewith of a continuous conveyor movement of wiper elements adapted to pass over the wetted area of a floor surface with a wiping and cleaning action which not only thoroughly cleans the surface of the floor as it is wetted but also wipes the wetted surface to remove moisture therefrom.

A still further aim of the invention is to provide a machine of the kind referred to in which the wiper elements are devised as a part of an endless conveyor having endless chains engaged over sprockets and carrying a continuity of spaced wiper devices of a yieldable character, including absorbent wiper elements which, in initial contact with a floor surface are forcibly brought into wiping contact to effect an efficient cleaning action in co-operation with the cleaning solution and which are progressively advanced in floor-engaging contact with a withdrawing motion whereby to pick up moisture which leaves the floor area acted on in a clean and substantially dry condition. This is achieved by arranging the endless conveyor with a lower stretch or run having a rear portion disposed in such proximity to the floor surface that the wiper elements make forcible contact with the floor surface as they sweep under the rear portion of the endless conveyor and advance toward the front portion of the bottom stretch which is upwardly inclined in the forward direction of travel whereby to effect a receding and relaxing action on the part of the wiper elements. This enables them to pick up moisture as they break contact with the floor surface.

Another and important aim of the invention is to provide for the extraction of moisture from the wiper elements by an overhead squeezing device and the provision of a receiver in the form of a tank for catching liquid removed from the wiper elements as they pass overhead. A still further important object of the invention is to provide a tank for holding a supply of solution within the confines of the endless conveyor for delivery of the solution to a sprayer head disposed in advance of the lower stretch of the endless wiper conveyor, whereby to distribute the solution at the forward end of said lower stretch so that as the machine operationally advances over a floor area the area will be wetted for a cleansing operation. A distinctive feature of the endless wiper conveyor is that its lower stretch is devised with a manually operable contrivance for elevating to an inoperative position as required in the use of the machine.

With these and subsidiary objects in view, the machine comprises a novel construction and arrangement of parts as detailed in the ensuing specification and illustrated in the accompanying drawings forming a part thereof.

In the drawings:

FIG. 5 is a fragmentary side view of the machine similar to FIG. 1 but showing the lower stretch of the endless wiper raised clear of the floor surface; and FIG. 6 is an enlarged perspective view depicting a crank mechanism forming a part of the elevating mechanism, by which the lower stretch of the endless wiper conveyor is raised from the floor surface and lowered to the floor surface.

Figure 1:
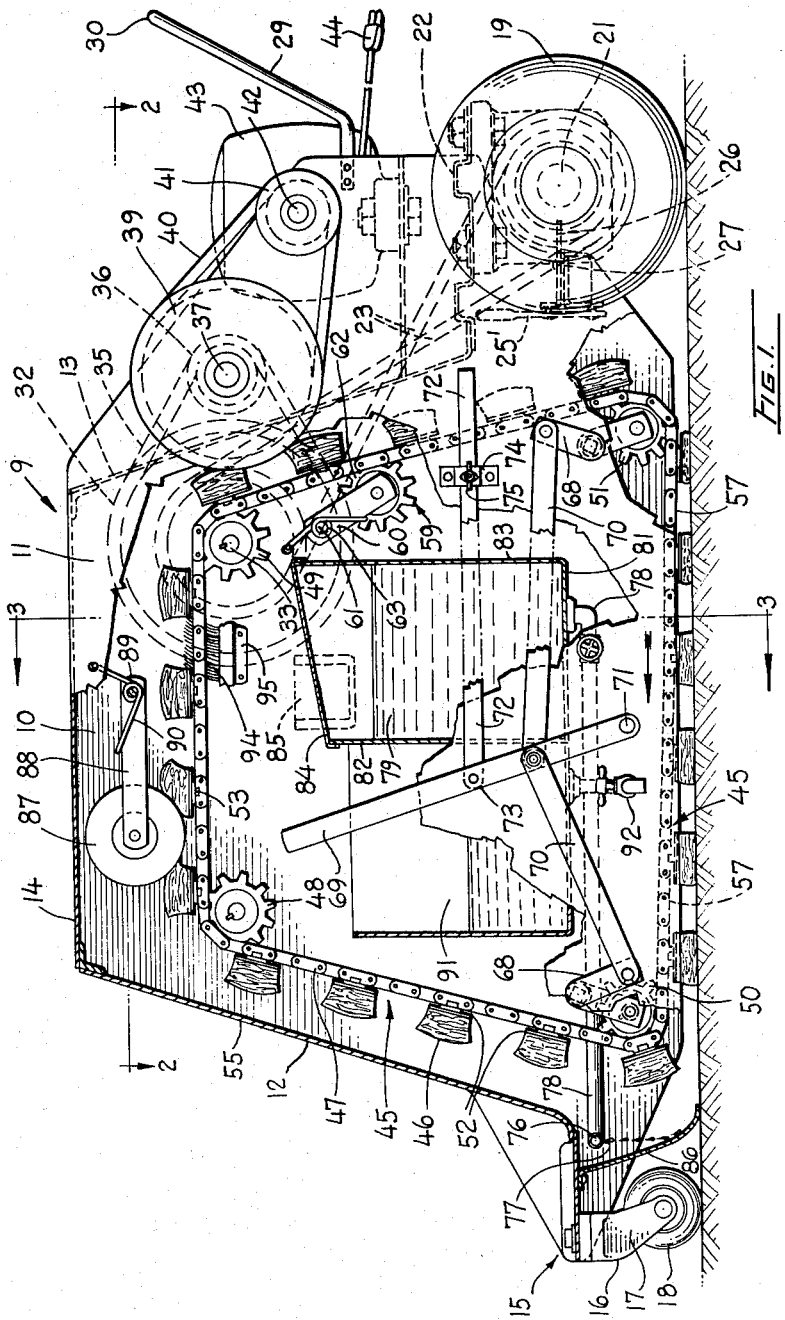
FIG. 1 is a side elevation of the floor washing machine partly in section to disclose the interior mechanism to better advantage.
Figure 2:
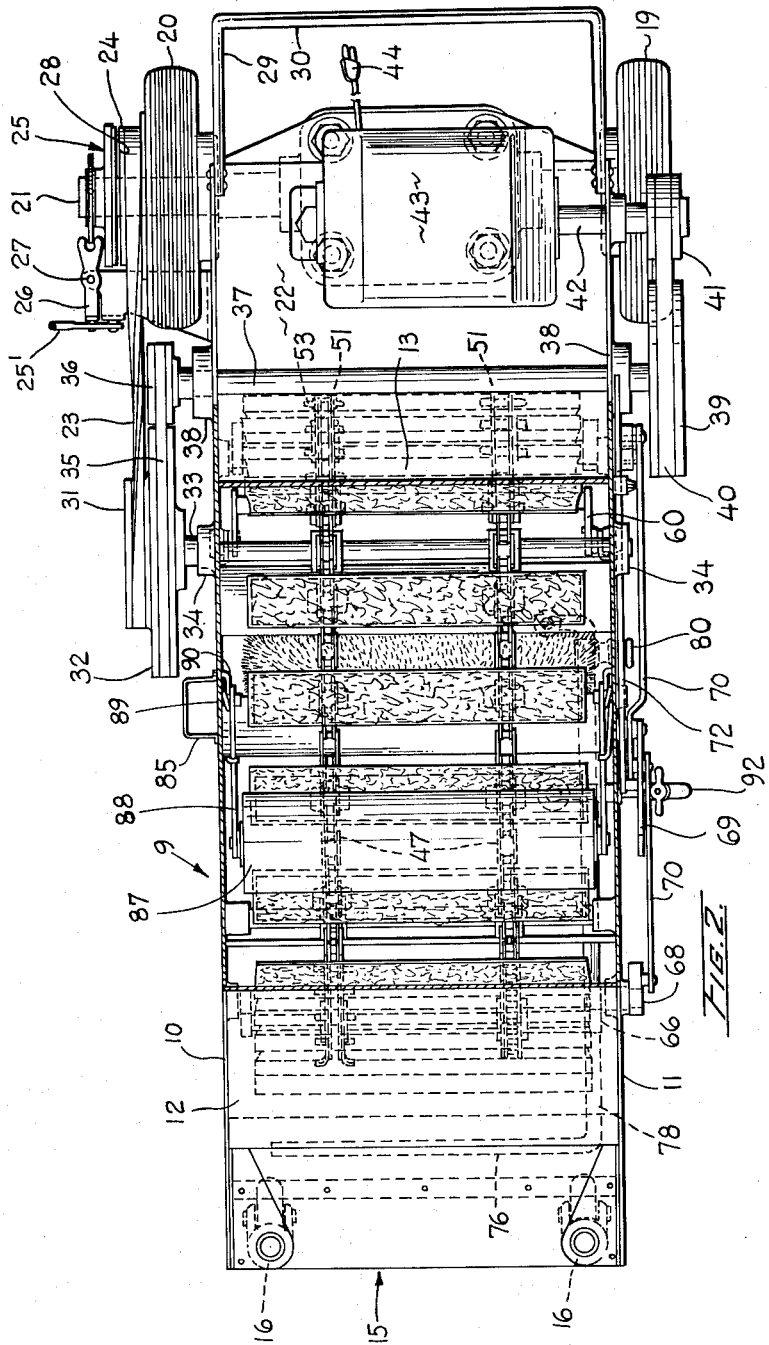
FIG. 2 is a horizontal sectional view taken substantially on line 2—2 of FIG. 1.
Figure 3:
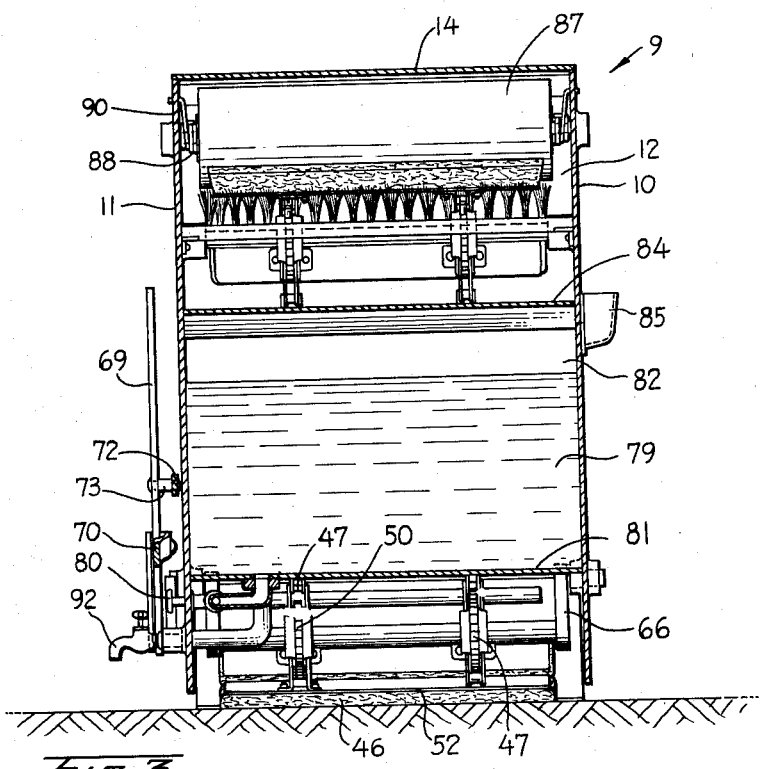
FIG. 3 is a vertical cross sectional view taken on line 3—3 of FIG. 1.
Figure 4:
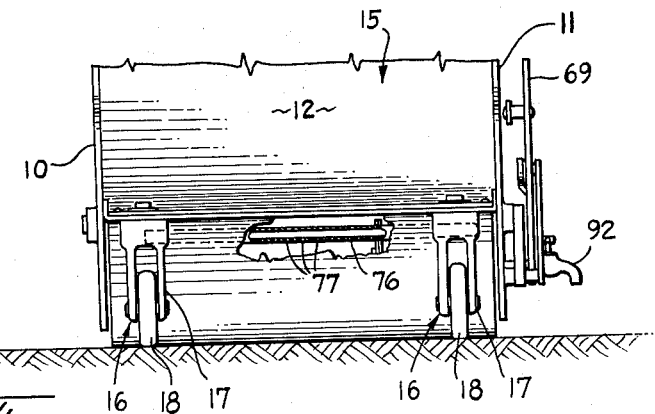
FIG. 4 is a fragmentary end elevation with portions broken away, and looking from left to right at FIG. 1.

The machine of my invention comprises a wheeled body for traversing a floor with an attendant washing operation and the wheeled body is indicated as a whole by the reference numeral 9. It is shown as comprising similar side walls 10 and 11, a front wall 12, rear wall 13 and a top wall 14. Said enclosing walls define a chamber open at the bottom. One or more of these walls may be equipped with inspection doors or the like for gaining access to the interior, which doors are not shown, since they do not form a part of the invention. The construction of the body is given by way of example but not of limitation as it will be manifest that modification may be resorted to according to dictates of manufacture.

The front end of the wheeled body is indicated at 15 and is supported by conventional castors 16 comprising the forks 17 and wheels 18. This part of the running gear enables the body 9 to be turned in any direction, and the other part of the running gear comprises the rear wheels 19 and 20 mounted upon an axle 21 supported in bearings carried by a rear deck portion of the body 9, which deck portion is indicated at 22.

The machine is self-propelled and to this end the rear wheel 20 is driven. Conventional means is employed to enable one of the rear traction wheels to turn at a different speed to the other as required in steering the vehicle from one side to the other. The conventional means referred to may comprise a ratchet device for providing an over-run of one element thereof relative to the other, as in making the shaft 21 in two parts and connecting them together by the ratchet mechanism. On the other hand, the shaft may be made in one piece and have one of the wheels keyed to it while the other wheel is provided with an over-run clutch connection. Such expedients are well known in the art and do not per se form a part of the invention.

Traction wheel 20 is associated with a belt drive comprising a belt 23 trained over a pulley 24 which is a loose pulley journalled on the shaft 21. Pulley 24 has a driven element of a clutch 25 of the plate type for driving engagement and dis-engagement whereby the machine may be propelled at the will of the operator by manipulation of a clutch lever such as that indicated at 25'. The clutch lever is shown as having a shift fork 26 pivoted at 27 and engaged with a driving element 28 of the clutch. When the clutch is thrown in the traction drive is set in operation to propel the vehicle which is steered by a handle 29 having a cross bar 30. The handle is disposed at the rear of the body 9 and extends upwardly for the convenience of the operator.

The power drive includes a pulley 31 over which the belt 23 is trained, and this pulley is united with a larger pulley 32 for unitary movement. Pulleys 23 and 32 are made fast to a driven shaft 33 which is journalled in bearings 34 mounted on the side walls 10 and 11 and shouldered against endwise movement. Shaft 33 forms a part of the endless wiper conveyor presently to be detailed.

A belt 35 is trained over pulley 32 and over a pulley 36 of reduced diameter made fast on a transverse shaft 37. Shaft 37 is a counter-shaft which is mounted in bearings 38 provided on the side walls 10 and 11. The end of counter-shaft 37 which is removed from the pulley 36 projects from the side wall 11 and rigidly carries a pulley 39 over which is trained a belt 40 engaged on a pulley 41. This pulley is a driver which is keyed on a shaft 42 of an electric motor 43 mounted on the deck 22 of the body 9. A plug-in cord 44 serves to make an electrical connection with a service outlet of an electrical supply. A control switch is incorporated in the electrical circuit but is not shown. It will, however, be located where most convenient for the operator.

The belt-and-pulley transmission herein recounted for driving said shaft 37 makes a suitable, speed-reduction for operation of the endless wiper conveyor but, of course, it will be understood that other forms of transmission for driving said shaft 37 could be employed to incorporate speed reduction and it is not intended that the invention shall be restricted in this respect. It will be apparent that when the motor is set in operation the rotation of shaft 21 will drive the traction wheels 19 and 20 provided the clutch is engaged. The propulsion of the machine will, of course, be entirely under the control of the operator by reason of the clutch.

The endless wiper conveyor is disposed entirely within the confines of the body 9 and is denoted as a whole by the numeral 45. The endless wiper conveyor comprises a sequential arrangement of wiper elements 46 attached to endless carriers 47 trained over rotary elements 48, 49, 50, and 51. Two such spaced carriers are employed and these are shown in the form of endless link chains spaced apart and each vertically arranged to extend longitudinally of the vehicle. The rotary elements are shown as sprockets having toothed engagement with the link chains respectively. The sprockets 49 of each link chain are keyed on the shaft 33 to provide for driving the endless conveyor when the motor 43 is energized.

The wiper elements 46 are arranged across said link chains 47 and attached to links thereof by means of base plates 52. Said base plates are attached to the links as by lugs on the latter, which lugs are indicated at 53. Said wiper elements include strips of compressible absorbent material which may be of a pliant, cellular structure and may consist of cellulose, foam rubber or cellular plastic. The cellular pliant portion is indicated at 55 and is co-extensive with the base plates 52. The wiper elements are uniformly spaced and are shown as projecting outwardly from the chain for making wiping contact with the floor surface. These soft wiper elements compress readily when forcibly urged against the floor surface.

Sprockets 48 and 49 provide an upper set and are spaced apart to provide for an upper stretch of the endless wiper conveyor.

Sprockets 50 and 51 form a lower set which provide for support of a lower stretch 57 of the endless wiper conveyor, as best seen in FIGS. 1 and 5. In the lowered operative position of the lower set of sprockets the front sprockets 50 thereof are disposed at a slightly higher elevation than the rear sprockets 51 which slopes the lower stretch 57 of the endless wiper conveyor upwardly and forwardly at a slight angle in juxtaposition to a subjacent floor surface. The arrangement is such that in the travel of the wiper conveyor the wiper elements have forcible wiper engagement with a floor surface at the area of the rear sprockets 51 and are compressed to produce an effective wiping and cleaning action. As the wiper elements travel forwardly with the lower stretch of the wiper conveyor they are caused to gradually recede and are permitted to relax, as will be evident from an inspection of FIG. 1. This sloping arrangement of the lower run of the wiper conveyor is highly desirable in that it produces a very effective cleansing action in conjunction with a cleaning solution applied to the area of the floor surface beneath the machine as it is progressively advanced, thereby the machine performs a continuous cleaning operation. Unwanted slack is removed from each of the endless chains by means of an ordinary tensioning device, indicated at 59. The tensioning device is shown as comprising arms 60 pivotally supported on a cross bar 61 and carrying at its free end the idler sprockets 62 each engaged with an adjacent run of the respective chains 47 and pressed by torsional springs 63 which act on the arms to produce a tensioning effect.

Of course, other conventional means may be employed to effect the tensioning of the link chains if so desired.

Means are provided for elevating the lower run of the wiper conveyor in order to withdraw the wiper elements from contact with the floor surface at the end of washing operation and also to enable the machine to be moved about when not in use. Said elevating means comprises the provision of crank shafts, generally denoted at 65, which extend transversely of the machine and are journalled in the side walls 10 and 11 thereof—see FIG. 6 in particular. There are two such crank shafts. one of which carries the sprockets 50 and the other carries the sprockets 51. Each crank shaft is journalled in the side walls 10 and 11 and includes crank arms 66 connected at their free ends by a cross shaft 67 on which the respective sprockets 50 or 51 are journalled and suitably held against endwise movement by known means.

Each of the crank devices 65 rigidly carries a lever 68 at an end thereof adjacent the side wall 11 and the lever 68 on the one crank device radially projects in an opposite direction to the lever 68 on the other crank device, as clearly shown in FIGS. 1 and 5. The levers 68 are connected to a hand-shift lever 69 by means of pitmans 70. The hand-shift lever 69 is fulcrumed at 71 on the side wall 11, and locking means are supplied to secure it in a set position.

The locking means is shown as comprising a bar 72 pivoted to the hand-shift lever at 73 and extending horizontally therefrom with its free end loosely engaged in a keeper plate 74. The keeper plate has a thumb screw 75 which upon being tightened locks the bar 72 against endwise movement, which thus secures the hand-shift lever 69 against movement. From the foregoing it will be evident that the elevating means functions to retain the sprockets 50, 51, in a predetermined operative position in which the lower run 57 of the wiper conveyor is held in its lowered position, shown in FIG. 1. To elevate the lower stretch 57 of the wiper conveyor it is only necessary to shift the hand lever 69 forwardly, as shown in FIG. 5, which swings the crank shaft devices 65 to raise the sprockets 50 and 51 along with the lower stretch 57 of the wiper conveyor. It will be noted that the arms 66 of the crank devices 65 swing outwardly in the raising movement and therefore the tautness of the chains is maintained which is an important feature. It is, of course, necessary to slacken the thumb screw 75 in order to permit the hand lever 69 to be shifted. The hand lever is locked in the raised position by again tightening thumb screw 75. Various other expedients may be resorted to as a locking means for the hand lever, if so desired.

In the application of a cleansing solution to the floor area acted on at any one time by the endless wiper, it is brought about by a sprinkler head denoted at 76. This sprinkler head is shown as a transverse manifold, located at the forward end of the machine in advance of the wiper conveyor, and supplied with a longitudinal series of discharge openings, indicated at 77 through which the cleansing solution is allowed to emanate onto the floor surface. Said sprinkler head is suitably supported within the chamber of the vehicle body and has a connection by means of a pipe 78 with a supply tank 79. A shut-off valve 80 is interposed in the delivery line 78.

The tank 79 contains a suitable liquid solution for washing a floor of a kind commonly employed for this purpose, which usually is water and detergent of one kind or another. The delivery line 78 is connected to the bottom wall 81 of the tank. Said tank extends transversely of the vehicle body 9 and is integral with the side walls 10 and 11 thereof. The tank has front and rear walls 82 and 83 and is covered by a lid 84 which slopes downwardly and forwardly. At the side wall 10 of the vehicle body there is supplied a fill opening 85 which leads into the upper portion of the tank for the purpose of introducing the cleansing solution in a filling operation.

From the foregoing it will be gathered that in beginning a cleaning operation on a floor the valve 80 is opened to allow for a distribution of the cleansing solution onto the floor surface below the machine and the wiper conveyor 45 is set in motion and its lower stretch 57 is lowered into operative position. As the washing operation is carried out the traction drive is used to propel the machine from one floor area to another to progressively wash the surface. Desirably a flexible apron 86 is supported to depend immediately in advance of the sprinkler head 76 in order to direct the discharged solution toward the wiper elements of the lower stretch of the conveyor. This flexible apron is shown as having its lower end resting on the floor surface so that it will be pulled therealong in the forward movement of the machine.

Since the wiper elements 46 absorb the solution, it is necessary to provide means for ridding them of the solution and to this end there is provided a "squeegee" device for squeezing the wiper elements. This squeezing device comprises a transverse roller 87 overlying the upper stretch of the wiper conveyor and rotatably supported on arms 88 pivoted at 89 in the respective side walls of the body 9. The roller rides on the wiper elements as they pass therebeneath and thus effect the squeezing thereof. The weight of the roller may be assisted by spring pressure supplied as by torsional springs 90. As the cleansing solution is squeezed from the wiper elements it drops into a receiver tank 91 positioned in advance of supply tank 79. This receiver extends transversely and is supported by the side walls 10 and 11. A drain cock 92 is fitted to the bottom of the receiver for emptying purposes. It is desirable to employ a brush beyond the "squeegee" device for brushing the wiper devices to free them of any drops of the cleansing solution. Such a brush is indicated at 94 and is disposed in inverted attitude with the bristles projecting upwardly to contact the wiper elements. The brush extends transversely of the wiper conveyor and has its back attached to the side walls 10 and 11, as at 95. As the cleansing solution drips from the brush it drops onto the sloping lid 84 of the supply tank which acts as a shed to drain the water into the receiver tank 91.

It will be manifest that the machine can be guided in any direction by the handle 29 and it has been demonstrated that this machine is highly efficient and serviceable. It performs a quick and satisfactory cleaning operation on a floor surface. It is easy to manipulate and will be found most satisfactory for the cleaning of floors. While I have disclosed a selected form of the invention it will be understood that various changes and modifications may be resorted to as fairly come within the scope of the appended claims.

What is claimed is:

1. In a floor washing machine, a vehicular body normally maintained in a substantially parallel position with respect to a surface being traversed during a washing operation, an endless wiper conveyor mounted on said body and including a plurality of spaced, outwardly extending wiper devices disposed in outwardly extending relation transversely of the direction of movement of said wiper conveyor, power means operatively connected to said conveyor for moving it relative to said body, said wiper conveyor having an upper and lower stretch, said lower stretch being spaced above the surface over which said vehicular body will traverse, means on said body and operatively connected to said wiper conveyor for elevating said lower stretch of the wiper conveyor, said wiper devices being of a yieldable character, said lower stretch of said wiper conveyor extending angularly from front to rear of said body and said wiper devices being progressively collapsible during operation of said endless wiper conveyor, the wiper devices during said relative movement being brought into forcible wiping contact initially with the surface being cleaned and subsequently expanding to pick up residual liquid at the rear of said endless conveyor stretch.

2. The structure of claim 1, said endless wiper conveyor comprising a pair of endless link chains arranged in parallel disposition and connected at intervals by said wiper devices, said chains being engaged on upper and lower sets of sprockets, the upper set of sprockets being journalled on said vehicular body, said lower set of sprockets including front and rear sprockets, said front sprockets being journalled on a first transverse crankshaft which is fulcrumed on said body, said rear sprockets being journalled on a second transverse crankshaft, said crankshafts forming part of said means for elevating at least said lower stretch of said endless wiper conveyor, and a lever fulcrumed on said body, and pitmans connecting said crankshafts to said lever.

3. The structure of claim 2, wherein a locking device is adapted to secure said lever in set position.

4. The structure of claim 1 including a receiver tank in said body and opening toward said upper conveyor stretch, and a squeezing device on said body above said receiver tank and in the path of travel of said wiper devices for engaging and squeezing residual water therefrom into said receiver tank.

5. The structure of claim 4 including a cleansing solution tank on said body including means for dispensing fluid forwardly of said lower conveyor stretch, said receiver tank including a lid directed angularly toward said receiver tank for directing residual fluids into the receiver tank.

6. The structure of claim 5 including a brush device disposed above said lid and engageable with said upper conveyor stretch for removing foam and the like therefrom and causing it to descend onto said lid.

References Cited in the file of this patent

UNITED STATES PATENTS

| | | |
|---|---|---|
| 1,504,476 | Horembala | Aug. 12, 1924 |
| 1,511,248 | Walton | Oct. 14, 1924 |
| 1,522,133 | Labiga et al. | Jan. 6, 1925 |
| 1,813,026 | Coole | July 7, 1931 |
| 2,930,055 | Fallen et al. | Mar. 29, 1960 |
| 3,051,973 | Jacques | Sept. 4, 1962 |